Jan. 14, 1958 J. SALAUZE 2,819,962
METHOD OF PRODUCING SINTERED PLATES FOR GALVANIC CELLS
Filed March 12, 1954
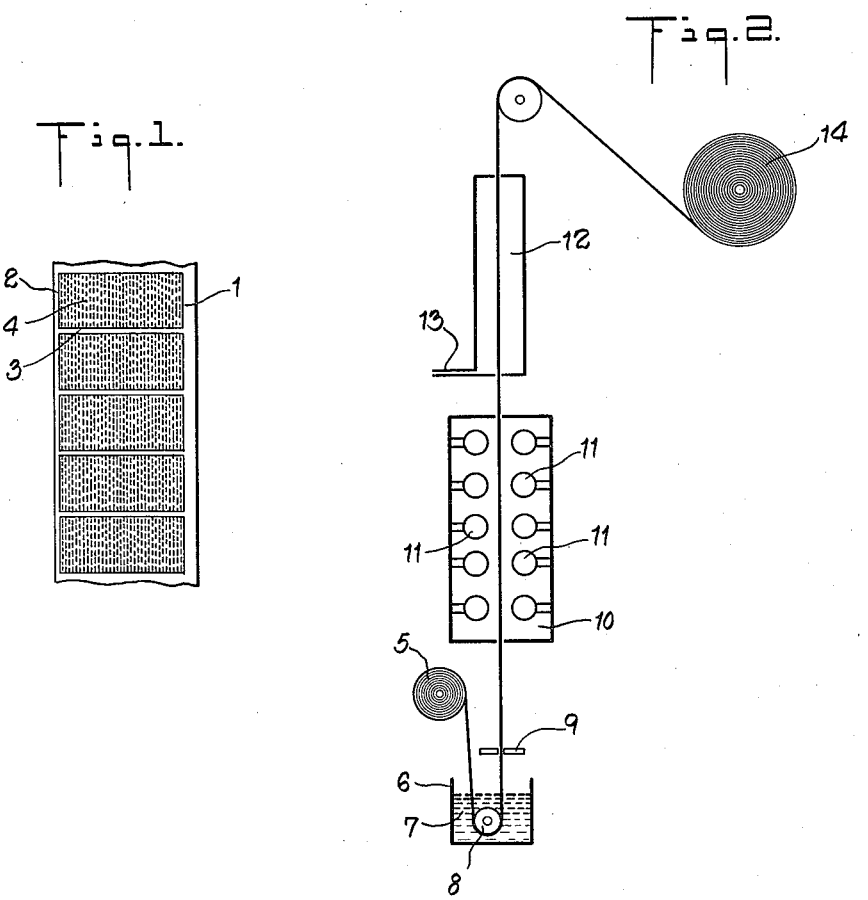
INVENTOR.
JEAN SALAUZE
BY
ATTORNEYS United States Patent Office 2,819,962
Patented Jan. 14, 1958

2,819,962

METHOD OF PRODUCING SINTERED PLATES FOR GALVANIC CELLS

Jean Salauze, Paris, France, assignor to Societe des Accumulateurs Fixes et de Traction (Societe Anonyme), Pont de la Folie, Romainville, France, a company of France Application March 12, 1954, Serial No. 415,748

Claims priority, application France March 17, 1953

14 Claims. (Cl. 75—208)

This invention relates to electrodes for galvanic cells. An object of the invention is to provide an improved method of producing sintered plates adapted to act as carriers for the active electrode material. Other objects of my invention will be apparent from the following specification.

The capacity for discharge at extremely high rates is more and more required from galvanic cells. In other words, it is desired to have a cell whose voltage remains at a relatively high level while, at the same time, it is able to deliver discharge currents whose intensity expressed in amperes would be 20 to 30 times the capacity of the cell expressed in ampere-hours. For this purpose, the surface of the plates has to be considerably increased, that is, a great number of very thin plates must be used, providing a great surface per capacity unit. Moreover, it is essential to use active materials which are themselves highly divided so as to facilitate to the utmost the electrochemical exchanges. The large number of such plates required for a given capacity means a very high cost price when the plates are manufactured by known methods.

One of the great technical improvemeunts made in the art, is the production of the so-called "sintered type" plates, in which nickel powder having a low apparent density and being sintered upon a metallic support, serves to carry the active materials. The sintered plates must be as porous as possible. For this purpose, two conditions are required, namely, first, using a low apparent density powder, and second, preventing a rise in the said apparent density during the different steps of the sintered plate manufacture.

The special powders of either pure nickel or iron-nickel alloys produced by the thermal decomposition of nickel carbonyl or nickel carbonyl-iron carbonyl mixture, and used for the sintered plate manufacture have an apparent density from 0.5 to 1.5. They are constituted of fibres, a few tenths of millimetre long, made up of metallic grains having a few microns diameter, which are linked— end to end. It is due to the said fibrous structure that the apparent density is so low. But the fibres are fragile and can readily be destroyed when they are handled without due care. Their being damaged results in an increase of the apparent powder density, and consequently in a lesser degree of porosity in the manufactured plate. Yet it is essential that the porosity be as high as possible, since the active materials are located inside the pores of the plate.

The present invention provides a process of continuous manufacture of sintered plates for galvanic cells which is both simple and economical. Moreover, my novel process makes it possible to prepare plates of various thickness and particularly very thin plates, 1 millimetre thick and even less. Finally, with the said process, the fibrous structure of the nickel or the iron-nickel powder is maintained substantially unimpaired. The apparent powder density, consequently, does not increase and highly porous sintered plates, thereby can be obtained.

The process, essentially, consists in continuously coating both faces of a moving perforated metallic band, with a suspension of the said powder in water or in any other suitable volatile liquid in which has been dissolved a material imparting a high viscosity to the solution. The band, next, runs through a dryer in order to dry the coating and then through a furnace in which the nickel coatings are sintered. Finally, the band is cut up into pieces corresponding to the required plate dimensions, which are then ready to be impregnated with the active material.

A modification of said process consists in carrying out the impregnation step inside the pores of the sintered coating by operating upon long stretches of the band prepared according to the above description, and in cutting the band only after the said impregnation treatments.

In the drawing, Fig. 1 shows a view of a preferred embodiment of the carrying band. Fig. 2 shows a diagrammatic view of a preferred embodiment of the manufacture process. Fig. 3 is a plan view of a plate obtained after the cutting of the band prepared according to the process.

The supporting member or core of my sintered plate is constituted of a long metallic band. It is made of a metal substantially unaffected by the electrolyte of the galvanic cell. However this is no essential condition, when the plate is to be used in quick deferred action type batteries. Practically, nickel, copper and especially iron, will be mainly used for economical reasons. When the band is made of copper or iron, it is previously covered on both faces, when perforated, with adherent nickel layers a few microns thick, preferably by passing it continuously through an electrolytic nickel plating bath.

The thickness of the band varies to a certain extent according to the surface and thickness of the plates which are to be obtained and also according to the intensity of the discharge currents which are required from the galvanic cell. The thickness of the band may be from 0.05 millimetre up to 0.15 millimetre, or even more if it is necessary.

In order to make the further band-cutting operation easier, it is advisable that the width of the band should be a multiple of the length or the width of the plates to be obtained. In a preferred embodiment of the invention, shown in Fig. 1, the width of the band is merely equal to the length of the plate.

When a solid band is used, it is first perforated by stamping or any other mechanical process. The perforations may assume various geometrical shapes. However, it is advisable to use circular perforations with approximately 1 to 3 millimetres diameter, the said perforations being regularly distributed, so that the perforated surface may be about 30 to 60% of the total surface. During the perforating step, there will preferably be left a non-perforated zone 1, of sufficient width, so that the plate-head (15, Fig. 3) can later be cut from it. On the other side of the band, the edge 2 a few millimetres wide, intended to be the bottom of the plates, is preferably similarly left unperforated. Finally, cross zones 3, a few millimetres wide, will also be left imperforate. The plates are to be made by shearing crosswise within the zones 3 of the band. Quadrilaterals 4 are perforated. Of course, the non-perforated zone disposition varies according to each different cutting method. Besides, the non-perforated zone arrangement is not essential; it is only useful.

Instead of a solid band, a band of screening may be used, in which case it is obvious that the perforating step becomes unnecessary. A fine mesh screen, with a mesh diameter of the order of 3 millimetres, is preferred.

The following step consists in preparing a suspension of the nickel or iron-nickel powder in a liquid medium of a high viscosity. This medium can be any volatile liquid which does not alter or react with the powder used and in which suitable products are dissolved in order to give sufficient viscosity to the medium, so that the powder may remain in suspension without leaving any deposit. The suspension, therefore, remains homogeneous, and its composition remains constant. Water is the most practical and economical liquid. In order to have a sufficient viscosity, a few percent by weight of such organic products as alginates, gelatins, starch and more particularly such soluble cellulose derivatives as the alkaline or ammonium salts of the carboxymethylcellulose, the methylcelluloses, the hydroxyalkylcelluloses, hydroxyethylcelluloses and hydroxypropylcelluloses are dissolved in the suspension. The cellulose derivatives, particularly, when used in very small amounts give a strong viscosity as high as 4,000 centipoises, though such high viscosity is not required. Moreover, these cellulose derivatives give the suspension good adhesive properties. The amount of the organic product to be used depends upon its chemical nature and more particularly upon the degree of viscosity it may give. Usually, the quantity varies between 1 and 5%. Besides, there is no regular rule of proportionality between the quantity of liquid and the quantity of metallic powder used to prepare the suspension. The amount of powder to be introduced into a given volume of the liquid greatly depends upon the said powder density, and the length of the fibres of which the said powder is made. The following example, therefore, is given by way of illustration and not to be construed as limiting the invention.

Example.—One mixes up for a few minutes in a mixer the following mixture:

Water _____ litres__ 10
Sodium salt of the carboxymethylcellulose__grams__ 300
Nickel or iron-nickel powder having an apparent
  density equal to 1_____ kg__ 10

Figure 2 shows one of the preferred embodiments of the device.

The long perforated band is wound on roll 5. The viscous mixture 7, prepared according to the previous description is put into the container 6. The band passes through the mixture under roll 8 which is submerged in it. As the band moves through the mixture, both faces and the inside of the perforations are covered with a rather thick layer of the viscous suspension. The total thickness of the viscous layer which is left on the band and on which the thickness and capacity of the finished plates depend, is controlled by the passage of the band through and in contact with the edges of a slot 9 of adjustable width. The slot is preferably so conformed as to remove substantially the coatings which cover zones 1 and 2 of the band, as the said band passes through it. Next, the band passes into a dryer 10 where the liquid having served to prepare the suspension is evaporated. The said dryer can be heated by any appropriate heating means, such as electrical resistance, steam coils, etc. However, the preferred heating process consists in using infra-red radiations such as produced for instance by infra-red lamps 11. By means of infra-red heating, the effect of the drying is more homogeneous for it is carried on inside the mass itself of the metallic powder, and cracks upon the coatings may consequently be avoided.

The band leaves the dryer in a dry condition. Immediately after, it passes into a sintering furnace 12, heated up to a temperature from 800° to 1,050° C. and provided with a non-oxidizing, i. e. neutral or preferably slightly reducing, atmosphere by continuously introducing a suitable gas through the manifold 13. Such suitable gases are, for instance, hydrogen, carbonic gas, nitrogen, cracked ammonia gas, and the like. The excess of the gas escapes from the slots provided on the walls of the furnace muffle for the inlet and outlet of the band. The sintering operation results in welding together the fibres or particles of the nickel or iron-nickel powder, which cover both faces of the band. Besides, the said operation also affects the coating located inside the band perforations, thereby establishing a very great number of connections between both coatings. Still more, it has an action between the pulverulent parts and the adherent nickel layers previously plated on the band by electrolysis. The great number of connections results in a strong adherence of the sintered product onto the band.

Finally, on leaving the sintering furnace, the band is wound up on the driven roll 14, which by turning unwinds the band placed on the roller 5, and moves it continuously through the device which has just been described.

The band so prepared, either before or after impregnation with the active materials, is mechanically cut into plates, as for example by cutting along zones 3 of Fig. 1. In the non-perforated part of zone 1, the head of the plate shown at 15, in Fig. 3, is shaped by cutting according to requirements. When electrodes of very large dimensions are wanted, such for instance as those used in winding assemblies, the zone 1 may be supplied with several lugs.

It is not necessary to prevent the formation of a sintered coating on the zone 1. In that case, it is sufficient to compress the sintered product on the places in which the head of the plate will be cut out, by locally exerting a very strong compression. However, it is more advisable, in respect to the plate assembly on a common terminal, to leave the said places uncoated as has been described.

Other processes of sintered plate continuous manufacture have already been proposed. One of them, particularly, consists in projecting a much less viscous suspension against the faces of the band by means of a propeller which would be located in the container 6 of Fig. 2. But such a method, when applied to the very slight metallic powders resulting from the decomposition of corresponding metal carbonyls, is inadequate, for it breaks the fragile metallic fibres, and thereby considerably lowers the porosity of the sintered coating which is obtained. It is necessary, therefore, to associate the said process with the use of so-called "spacing bodies" products, which are added to the mixture of water and metallic powder, and which are destroyed during the sintering operation or any other operation undertaken for this purpose. Apart from the complication, the pores of the sintered coatings, which are obtained thereby, are non-uniform, which has an adverse effect on the further working of the impregnated active materials.

Finally, another advantage of the process embodying my invention consists in the systematic use of a very highly perforated band. Owing to the use of the said band, it is not essential that the thickness of the sintered coatings be precisely the same on both faces of the band, thus simplifying manufacturing procedure and control.

Reference is herewith made to my copending applications Serial Nos. 415,747 and 415,749, both filed March 12, 1954, and containing disclosures of related but different inventions.

What is claimed is:

1. A method of producing sintered plates for galvanic cells, comprising the steps of preparing an aqueous homogeneous suspension consisting solely of water, a viscosity increasing agent dissolved therein and of fibrous iron-nickel group metallic powder having interlacing properties and derived from the thermal decomposition of corresponding metal carbonyl, maintaining the suspension quiescent, passing a perforated metallic band through the quiescent suspension to coat both faces of the band and fill its perforations, thereafter doctoring the thickness of the coatings retained on the band as a result of its passage through said suspension, passing the doctored, coated band through a heating zone to dry the coatings and then subjecting the band with its dried coatings to sintering heat in a non-oxidizing atmosphere, said coating, doctoring, drying and sintering steps being effected as a continuous sequential operation, and thereafter cutting the band into required dimensions.

2. A method according to claim 1, in which the band is a metal selected from the group consisting of nickel, copper and iron.

3. A method according to claim 1, in which the band is a metal selected from the group consisting of iron and copper and in which the said band has previously been coated upon both faces with a nickel layer between about 1 and about 5 microns thick.

4. A method according to claim 1 in which the band is a metallic screen.

5. A method according to claim 1 in which the thickness of the band is between about 0.05 to about 0.15 millimetre and in which the said band is first perforated with holes having a diameter from about 1 to about 3 millimetres, the said holes being uniformly distributed upon the whole surface of the band, except for both edges of the said band and narrow cross strips, which provide imperforate plate edges when the band is cut into plates, the percentage of the perforated parts being at least 30% of the total surface of the band.

6. A method according to claim 1, in which the fibrous metallic powder is a nickel powder having a low apparent density from 0.5 to 1.5, and resulting from the thermal decomposition of nickel-carbonyl.

7. A method according to claim 1, in which the fibrous metallic powder is an iron-nickel alloy containing at least 30% of nickel, having a low apparent density from 0.5 to 1.5 and resulting from the thermal decomposition of an iron carbonyl and nickel-carbonyl mixture.

8. A method according to claim 1 in which the aqueous suspension contains as the viscosity increasing agent between about 1% and about 5% by weight of at least one of the organic products selected from the group consisting of alginates, gelatins, starch, and soluble cellulose derivatives of the alkaline and ammonium salts of the carboxymethylcellulose, the methylcelluloses, the hydroxyalkylcelluloses, hydroxyethylcelluloses, and hydroxypropylcelluloses and wherein the fibrous metallic powder is held as a homogeneous suspension in the solution.

9. A method according to claim 1 in which the aqueous suspension contains about 1 to 5% of the sodium salt of carboxymethylcellulose as the viscosity increasing agent.

10. A method according to claim 1, in which the coatings which cover both faces and the perforations of the band are dried by continuously running the band past a source of infra-red radiations.

11. A method according to claim 1, in which the temperature of sintering is maintained in the range of 800–1050° C.

12. Plates for galvanic cells prepared according to the method of claim 1.

13. A method of producing sintered plates for galvanic cells comprising the steps of preparing an aqueous homogeneous suspension consisting solely of water, a viscosity increasing agent dissolved therein and of fibrous iron-nickel group metallic powder having interlacing properties and derived from the thermal decomposition of corresponding metal carbonyl, maintaining the suspension quiescent, passing a perforated metallic band through the quiescent suspension to coat both faces of the band and fill its perforations, thereafter doctoring the thicknesses of the coatings retained on the band as a result of its passage through said suspension, passing the doctored, coated band through a heating zone to dry the coatings and then subjecting the band with its dried coatings to sintering heat in a non-oxidizing atmosphere, said coating, doctoring, drying and sintering steps being effected as a continuous sequential operation.

14. Plates for galvanic cells prepared according to the method of claim 13.

References Cited in the file of this patent

UNITED STATES PATENTS

| | | |
|---|---|---|
| 1,988,861 | Thorausch et al. | Jan. 22, 1935 |
| 2,300,048 | Koehring | Oct. 27, 1942 |
| 2,332,746 | Olt | Oct. 26, 1943 |
| 2,390,160 | Marvin | Dec. 4, 1945 |
| 2,646,457 | Jacquier | July 21, 1953 |
| 2,681,375 | Vogt | June 15, 1954 |
| 2,708,212 | Koren et al. | May 10, 1955 |